(12) United States Patent
Wang et al.

(10) Patent No.: US 8,910,090 B2
(45) Date of Patent: Dec. 9, 2014

(54) METHODS INVOLVING PATTERN MATCHING TO IDENTIFY AND RESOLVE POTENTIAL NON-DOUBLE-PATTERNING-COMPLIANT PATTERNS IN DOUBLE PATTERNING APPLICATIONS

(71) Applicant: GLOBALFOUNDRIES Inc., Grand Cayman (KY)

(72) Inventors: Lynn T. Wang, Fremont, CA (US); Vito Dai, Santa Clara, CA (US); Luigi Capodieci, Santa Cruz, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 45 days.

(21) Appl. No.: 13/778,322

(22) Filed: Feb. 27, 2013

(65) Prior Publication Data

US 2014/0245238 A1    Aug. 28, 2014

(51) Int. Cl.
*G06F 17/50*  (2006.01)
(52) U.S. Cl.
CPC .................................. *G06F 17/5081* (2013.01)
USPC .............................. 716/52; 716/56; 716/132
(58) Field of Classification Search
None
See application file for complete search history.

(56) References Cited

U.S. PATENT DOCUMENTS

| 7,757,190 | B2 | 7/2010 | Dai et al. | |
|---|---|---|---|---|
| 7,802,226 | B2* | 9/2010 | Park et al. | 716/54 |
| 7,861,196 | B2* | 12/2010 | Huckabay et al. | 716/136 |
| 8,086,981 | B2 | 12/2011 | Lai et al. | |
| 8,108,805 | B2* | 1/2012 | Rathsack | 716/52 |
| 8,139,844 | B2* | 3/2012 | Chen et al. | 382/145 |
| 8,151,219 | B2* | 4/2012 | Huckabay et al. | 716/50 |
| 8,219,939 | B2* | 7/2012 | Schultz et al. | 716/50 |
| 8,304,172 | B2* | 11/2012 | Schultz | 430/313 |
| 8,347,240 | B2* | 1/2013 | Agarwal et al. | 716/54 |
| 8,365,102 | B2* | 1/2013 | Wang et al. | 716/51 |
| 8,381,139 | B2* | 2/2013 | Lin et al. | 716/52 |
| 8,402,396 | B2* | 3/2013 | Kahng et al. | 716/52 |
| 8,418,105 | B1* | 4/2013 | Wang et al. | 716/110 |
| 8,555,215 | B2* | 10/2013 | Zou et al. | 716/55 |
| 2008/0166639 | A1 | 7/2008 | Park et al. | |
| 2009/0257645 | A1 | 10/2009 | Chen et al. | |
| 2011/0078638 | A1 | 3/2011 | Kahng et al. | |
| 2011/0111330 | A1 | 5/2011 | Schultz et al. | |
| 2011/0111348 | A1 | 5/2011 | Schultz | |
| 2011/0219341 | A1 | 9/2011 | Cao et al. | |
| 2011/0239167 | A1 | 9/2011 | Rathsack | |

(Continued)

OTHER PUBLICATIONS

Jang et al.. "In-Design Process Hotspot Repair Using Pattern Matching," Design for Manufacturability through Design-Process Integration VI, Proc. of SPIE, vol. 8327, 2012, 8 pages.*

(Continued)

*Primary Examiner* — Leigh Garbowski
(74) *Attorney, Agent, or Firm* — Amerson Law Firm, PLLC (57) ABSTRACT

One illustrative method disclosed herein involves producing an initial circuit layout, prior to decomposing the initial circuit layout, identifying at least one potential non-double-patterning-compliant (NDPC) pattern in the initial circuit layout, fixing the at least one potential non-double-patterning-compliant (NDPC) pattern so as to produce a double-patterning-compliant (DPT) pattern, producing a modified circuit layout by removing the potential non-double-patterning-compliant (NDPC) pattern and adding the double-patterning-compliant (DPT) pattern to the initial circuit layout, and performing design rule checking and double patterning compliance checking on the modified circuit layout.

11 Claims, 8 Drawing Sheets

(56) References Cited

U.S. PATENT DOCUMENTS

| | | |
|---|---|---|
| 2011/0296360 A1 | 12/2011 | Wang et al. |
| 2012/0135600 A1 | 5/2012 | Lin et al. |
| 2012/0329266 A1 | 12/2012 | Hiramoto et al. |

OTHER PUBLICATIONS

Tritchkov et al., "Double-patterning Decomposition, Design Compliance, and Verification Algorithms at 32 nm hp," Photomask technology 2008, Proc. of SPIE, vol. 7122, 2008, 15 pages.*

Dai et al., "DRC Plus: Augmenting Standard DRC with Pattern Matching on 2D Geometries," Proc. of SPIE, vol. 6521, 65210A, 2007.

Dai et al., "Developing DRC Plus Rules through 2D Pattern Extraction and Clustering Techniques," Proc. of SPIE, vol. 7275, 727517-1, 2009.

Deng et al., "DPT Restricted Design Rules for Advanced Logic Applications," Proc. of SPIE, vol. 7973, 79730H-1, 2011.

Kahng et al., "Revisiting the Layout Decomposition Problem for Double Patterning Lithography," Proc. of SPIE, vol. 7122, 71220N-1, 2008.

Lucas et al., "Double-patterning interactions with wafer processing, optical proximity correction, and physical design flows," J. Micro/Nanolith. MEMS MOEMS 8(3), 033002, Jul.-Sep. 2009.

Park et al., "Application Challenges with Double Patterning Technology (DPT) beyond 45nm," Proc. of SPIE, vol. 6349, 634922-1, 2006.

Strojwas, "Cost Effective Scaling to 22nm and Below Technology Nodes," IEEE, 2011.

Wang et al., "Pattern matching for double patterning technology-compliant physical design flows," Proc. of SPIE, vol. 8327, 832708-1, 2012.

Yang et al., "DRCPlus in a Router: Automatic Elimination of Lithography6 Hotspots using 2D Pattern Detection and Correction," Proc. of SPIE, vol. 7641, 76410Q-1, 2010.

* cited by examiner

State of the Art

Pattern Matching

| Pattern ID # | No. of DPT Compliance Check Violations Resolved |
|---|---|
| 1 | 10 |
| 2 | 8 |
| 3 | 1 |
| 4 | 1 |
| 5 | 8 |
| 6 | 8 |
| 7 | 8 |
| 8 | 1 |
| 9 | 20 |
| 10 | 2 |
| 11 | 2 |
| 12 | 2 |
| 13 | 2 |
| 14 | 1 |
| 15 | 1 |
| 16 | 16 |
| 17 | 16 |
| 18 | 12 |
| Total | 119 |

Figure 8

METHODS INVOLVING PATTERN MATCHING TO IDENTIFY AND RESOLVE POTENTIAL NON-DOUBLE-PATTERNING-COMPLIANT PATTERNS IN DOUBLE PATTERNING APPLICATIONS

BACKGROUND OF THE INVENTION

1. Field of the Invention

Generally, the present disclosure relates to the manufacture of sophisticated semiconductor devices, and, more specifically, to various methods that involve the use of pattern matching techniques to identify and resolve potential non-double-patterning-compliant (NDPC) patterns or layouts that are encountered when using double patterning techniques to manufacture integrated circuit products.

2. Description of the Related Art

Integrated circuit products, or ICs, are generally created by patterning several layers of material so as to define the various devices and components, e.g., transistors, resistors, capacitors, etc., that are used to make the product. Generally, the process starts with the design of the integrated circuit using an electronic design automation (EDA) tool that allows a designer to interactively position and connect various components of the circuit. This design, in turn, is generated into a circuit layout by the electronic design automation tool. The circuit layout, also known simply as a layout, contains the physical locations and dimensions of the circuit's components, interconnections and various layers. The components, interconnections and various layers of the circuit form the features of the integrated circuit. As noted above, the integrated circuit design is eventually fabricated by transferring the circuit layout to a semiconductor substrate in a series of layers that collectively will form the features that constitute the devices that make up the components of the integrated circuit. However, before the layout can be fabricated, a validation process of the layout must take place.

Design Rule Checking (DRC) is the area of electronic design automation (EDA) that determines whether the physical layout of a particular chip layout satisfies a series of recommended parameters called design rules. Design rule checking is a major step during physical verification of the chip design. Design rules are a series of parameters provided by semiconductor manufacturers that enable the chip designer to verify the correctness of a product layout and the mask sets (reticle) used in manufacturing the product. Advanced processes and products may involve the use of more restrictive design rules in an effort to improve product yield.

Design rules may be specific to a particular semiconductor manufacturing process and/or product. In general, a design rule set specifies certain geometric and connectivity restrictions between features of the layout to ensure sufficient margins to account for variability in semiconductor manufacturing processes and to ensure that the circuits work as intended. Typically, there are several basic types of design rules that semiconductor manufacturers employ. The first are single layer rules, such as, for example, width rules, spacing rules and pitch rules. A width rule specifies the smallest allowable width of any shape in the design, i.e., the width of a metal line or a gate electrode structure. A spacing rule specifies the minimum distance between two adjacent features, like the spacing between two adjacent metal lines. Spacing rules can vary depending upon the nature of the relationship between the two adjacent features, e.g., corner-to-corner spacing, tip-to-side spacing, side-to-side spacing, tip-to-tip spacing, etc.

The magnitude of the space allowed by these various spacing rules will likely not be the same in all situations, e.g., the allowable tip-to-tip spacing may be different from the allowable side-to-side spacing. Additionally, the magnitude of the allowed spacing will likely be tighter (smaller) for more advanced products and processes as compared to older product generations. These single layer rules will exist for each layer of a semiconductor product, with the lowest levels typically having the tightest or most restrictive design rules and the highest metal layers on the product typically having larger, less restrictive design rules. There is also what is known as two layer design rules. A two layer design rule specifies a relationship that must exist between features on two separate layers of the product. For example, an enclosure design rule might specify that an object of one type, such as a contact or via, must be covered, with some additional margin of error, by a metal layer. There are many other design rules that are not discussed herein.

Typically, the design validation process is handled by a verification tool, which processes a circuit layout and verifies that the layout adheres to a set of specified design rules. One such verification tool is sometimes referred to as a design rule checker. Often times the design rule checker is implemented as a stand-alone software program, such as Cadence Assura®DRC, or as a part of an electronic design automation tool, such as Cadence Virtuoso®. The design rule checker examines a layout for violations of a set of specified design rules. The layout is usually received by the design rule checker in the form of a file that digitally represents the layout of the circuit. Current formats for layout files include, but are not limited to, GDS II and OASIS. When a design rule checker observes a circuit feature within the layout that violates a particular design rule, the violation is flagged by the design rule checker. Examples of how this flagged violation can be brought to the designer's attention include, but are not limited to, marking the violation directly in a resulting output layout file or graphically bringing attention to the violation within the electronic design automation tool.

Photolithography is one of the basic processes used in manufacturing integrated circuit products. At a very high level, photolithography involves: (1) forming a layer of light or radiation-sensitive material, such as a photoresist material, above a layer of material or a substrate; (2) selectively exposing the radiation-sensitive material to a light generated by a light source (such as a DUV or EUV source) to transfer a pattern defined by a mask or reticle (interchangeable terms as used herein) to the radiation-sensitive material; and (3) developing the exposed layer of radiation-sensitive material to define a patterned mask layer. Various process operations, such as etching or ion implantation processes, may then be performed on the underlying layer of material or substrate through the patterned mask layer.

Of course, the ultimate goal in integrated circuit fabrication is to faithfully reproduce the final circuit layout (design) on the integrated circuit product. Historically, the pitches employed in integrated circuit products were large enough such that a desired pattern could be formed using a single patterned photoresist masking layer. However, in recent years, device dimensions and pitches have been reduced in size to the point where existing photolithography tools, e.g., 193 nm wavelength photolithography tools, cannot form a single patterned mask layer with all of the features of the overall target pattern. Accordingly, device designers have resorted to techniques that involve performing multiple exposures to define a single target pattern in a layer of material. One such technique is generally referred to as double patterning or double patterning technology (DPT). In general, double patterning is an exposure method that involves splitting (i.e., dividing or separating) a dense overall target circuit pattern into two separate, less-dense patterns. The simplified, less-dense patterns are then printed separately utilizing two separate masks (where one of the masks is utilized to image one of the less-dense patterns, and the other mask is utilized to image the other less-dense pattern). Further, in some cases, the second pattern is printed in between the lines of the first pattern such that the imaged wafer has, for example, a feature pitch which is half that found on either of the two less-dense masks. This technique effectively enables the printing of even smaller features than would otherwise be possible using a single mask using existing photolithography tools. There are several double patterning techniques employed by semiconductor manufacturers.

One illustrative double patterning technique involves exposing the same layer of photoresist material to two separate exposure steps using two different reticles. After the second exposure, the double-exposed photoresist layer is then developed so as to define a patterned photoresist mask that may be used, for example, as an etch mask to transfer the pattern defined in the patterned photoresist mask to an underlying layer of material.

Another illustrative double patterning technique is more involved and generally involves creating the ultimate or desired target pattern in a hard mask material by performing two lithography and two etch processes—this process is sometimes referred to as an LELE (Litho-Etch-Litho-Etch) process. In an LELE double patterning process, a first photoresist layer is formed above a hard mask layer. Thereafter, the first photoresist layer is exposed during a first exposure process and subsequently developed to define a first patterned photoresist mask. Next, an etching process is performed through the first patterned photoresist mask on the hard mask layer to transfer the pattern in the first patterned photoresist mask to the hard mask layer. The first patterned photoresist mask is then removed from the now partially patterned hard mask layer. Next, a second photoresist layer is formed above the partially patterned hard mask layer. The second photoresist layer is then exposed during a second exposure process (using a different reticle) and subsequently developed to define a second patterned photoresist mask. An etching process is then performed through the second patterned photoresist mask on the partially patterned hard mask layer to transfer the pattern in the second patterned photoresist mask to the partially patterned hard mask layer. This latter etching process results in a final patterned hard mask layer having the desired target pattern. The second patterned photoresist mask is then removed. The final patterned hard mask layer may then be used to pattern an underlying layer of material.

To use double patterning techniques, an overall target pattern must be what is referred to as double-patterning-compliant. In general, this means that an overall target pattern is capable of being decomposed into two separate patterns that each may be printed in a single layer using existing photolithography tools. Layout designers sometimes speak of such patterns with reference to "colors," wherein the first mask will be represented in the EDA tool using a first color and the second mask will be represented in the EDA tool using a second, different color. To the extent a layout is non-double-patterning-complaint, it is sometimes stated to present a "coloring conflict" between the two masks. An overall target pattern may have many regions or areas that cannot be printed because the features in those regions are spaced too closely to one another for existing photolithography tools to be able to print such closely spaced features as individual features. To the extent an overall target pattern has an even number of such features, such a pattern is sometimes referred to as an "even cycle" pattern, while an overall target pattern that has an odd number of such features is sometimes referred to as an "odd cycle" pattern. Even cycle patterns can be formed using double patterning techniques, while odd cycle patterns cannot be formed using double patterning techniques.

If a layout cannot be separated or "decomposed" into two masks, the problem can be addressed by changing the circuit layout. The circuit layout is usually changed manually by a designer reviewing the output from design rule checking software. Changing a circuit layout is time-consuming and expensive because a designer aims to minimize the total volume of a circuit layout and a change to a portion of a circuit layout often affects structures in other layers or regions of the circuit layout. A designer must evaluate many alternate fixes before determining the best solution. Additionally, some fixes do not necessarily resolve certain odd cycle situations. Therefore, improved methods for efficiently resolving double patterning constraint violations are desired.

Figure 1A:
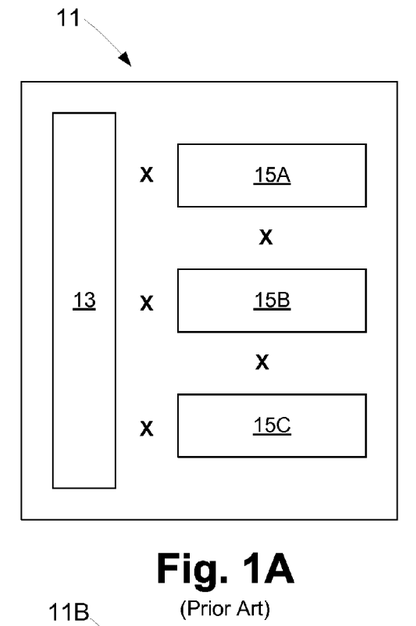
FIGS. 1A-1D depict one illustrative example of a circuit pattern that is impossible-to-decompose using double patterning techniques and one possible solution to produce a modified circuit pattern that can be manufactured using double patterning techniques.

FIGS. 1A-1D depict a very simplistic circuit layout that will be helpful in understanding the concepts mentioned above. FIG. 1A depicts a very simplistic circuit layout 11. The circuit layout 11 is comprised of line-type features 13 and 15A-15C. The "X" in FIGS. 1A-1D indicates where a design rule violation exists, i.e., the features are positioned too closely to one another. Thus, the circuit layout 11 in FIG. 1A cannot be formed using a single patterned photoresist mask. The initial task is to determine whether or not the circuit layout 11 can be formed using double patterning techniques.

Figure 1B:
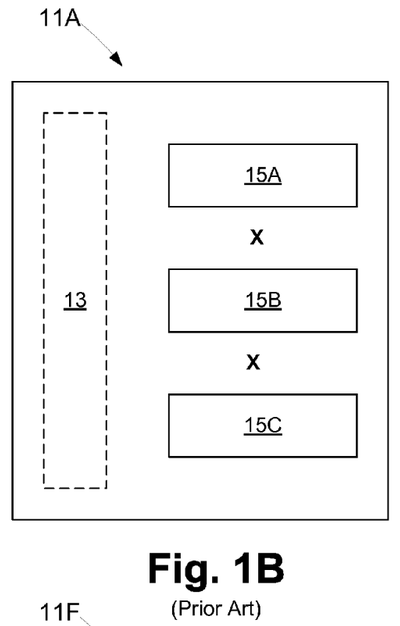

To that end, FIG. 1B depicts one possible arrangement 11A or so-called "coloring" in which the circuit layout 11 can be "decomposed" into two separate mask layers. Layout designers sometime speak of such patterns with reference to "colors," wherein the first mask will be represented in the EDA tool using a first color and the second mask will be represented in the EDA tool using a second, different color. To the extent a layout is non-double-patterning-complaint, it is sometimes stated to present a "coloring conflict" between the two masks. Layout designers also use the phrase "coloring solution" in describing various situations. For example, a potential non-double-patterning-compliant (NDPC) pattern may be referred to as a pattern that is perceived to have "no coloring solution." In FIG. 1B, one mask is depicted in dashed lines while the other mask is depicted in solid lines. More specifically, a first mask is comprised of only the feature 13, while a second mask is comprised of the three features 15A-15C. While the first mask does not violate any design rules, the second mask still violates the spacing design rules as indicated by the two "Xs" in FIG. 1B. Thus, the possible arrangement 11A, i.e., the first possible coloring solution, is not double-patterning-compliant.

Figure 1C:
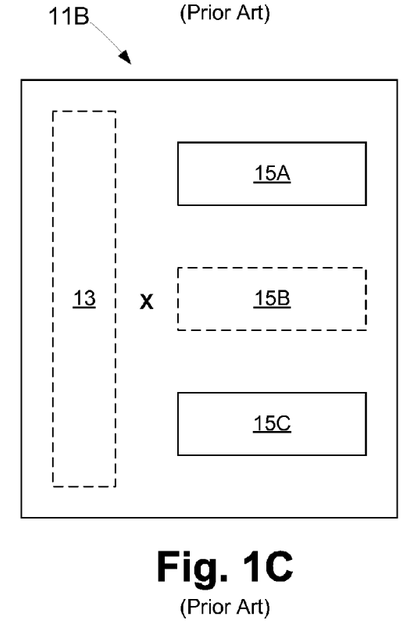

FIG. 1C depicts another possible arrangement 11B, i.e., another possible coloring solution, in which the circuit layout 11 can be "decomposed" into two separate mask layers. In FIG. 1C, one mask is depicted in dashed lines while the other mask is depicted in solid lines. More specifically, a first mask is comprised of the features 13 and 15B, while a second mask is comprised of the features 15A and 15C. While the second mask does not violate any design rules, the first mask still violates the spacing design rules as indicated by the "X" in FIG. 1C between the features 13 and 15B. Thus, the possible arrangement 11B, i.e., the second coloring solution, is not double-patterning-compliant.

Figure 1D:
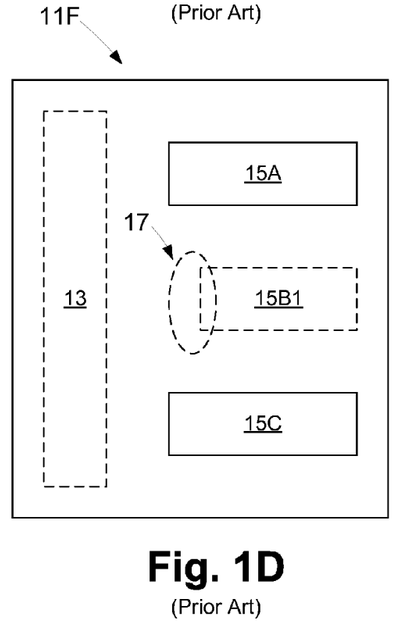

From the foregoing, it is clear that the circuit layout 11 is a layout that is an impossible-to-decompose (ITD) pattern that cannot be formed using double patterning techniques. Accordingly, the designer must modify or "fix" the circuit layout 11 such that it may be formed using double patterning techniques. To that end, FIG. 1D depicts an illustrative fixed arrangement 11F that is double-patterning-compliant. In this example, the fix involves reducing the axial length of the feature 15B in the region 17. This results in a new feature 15B1 that is spaced farther away from the side surface of the feature 13. This change effectively eliminates the design rule violation depicted in FIG. 1C. More specifically, as shown in FIG. 1D, a first mask is comprised of the features 13 and 15B1, while a second mask is comprised of the features 15A and 15C. Neither the first nor second mask violates any design rules, as indicated by the absence of any "Xs" in FIG. 1D. Thus, the fixed arrangement 11F is double-patterning-compliant.

Figure 2:
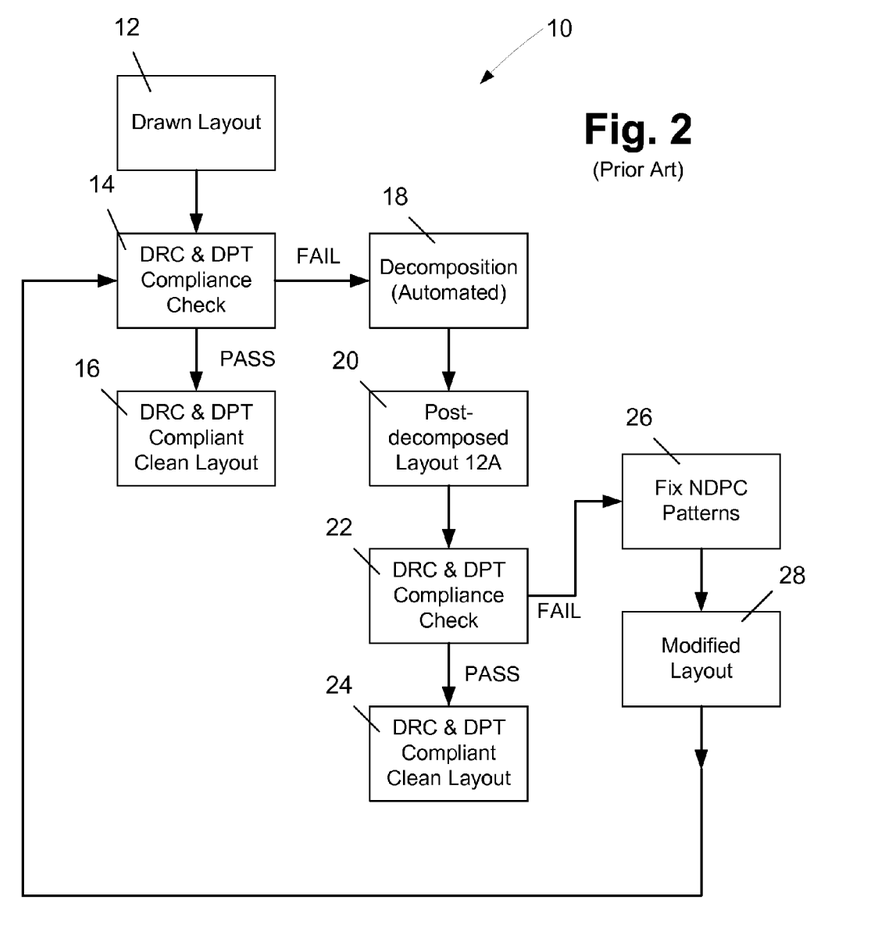
FIG. 2 is a simplistic depiction of an illustrative prior art electronic automation design software and method for determining whether or not a layout of an integrated circuit product is both design-rule-compliant and double-patterning-compliant.

FIG. 2 depicts one illustrative example of a prior art electronic design automation process that is performed for checking a layout to insure that the layout is both design-rule-compliant and double-patterning-compliant. As shown in FIG. 2, the software 10 is comprised of several functional modules that perform various activities. In general, an initial drawn circuit layout 12, in digital form, is subjected to analysis by the software 10 to determine whether or not the layout 12 is both design-rule-compliant (DRC) and double-patterning-compliant (DPT), as reflected in block 14. To the extent the initial layout 12 passes both the design rule checking and double patterning checking (PASS), the initial layout 12 is declared to be both design-rule-compliant and double-patterning-compliant, as indicated in block 16. To the extent that the initial layout 12 fails the design rule and/or double patterning checking (FAIL) in block 14, the entire initial layout 12 is subjected to decomposition in block 18. At that point, the initial layout 12 is decomposed in block 20 to produce a new post-decomposition layout 12A. The new post-decomposition layout 12A is then subjected to design rule checking and double patterning checking in block 22. To the extent the new post-decomposition layout 12A passes both the design rule checking and double patterning checking in block 22 (PASS), the new post-decomposition layout 12A is declared to be both design-rule-compliant and double-patterning-compliant, as indicated in block 24. To the extent that the new post-decomposition layout 12A fails the design rule and/or double patterning checking (FAIL) in block 22, the new post-decomposition layout 12A is determined to have one or more potential non-double-patterning-compliant (NDPC) patterns or layouts that must be fixed to eliminate the situations that are causing the new post-decomposition layout 12A to fail the design rule and double patterning checks, as indicated in block 26. Such fixes may involve adjusting the spacing, position and/or location of one or more features of the NDPC patterns. Determining which fixes to make is a very complex problem as movement or re-sizing of one feature on an integrated circuit product may necessitate changing the location, position or size of another feature. Moreover, there are typically several possible fixes to a particular problem. Thus, the designer must evaluate which solution is best for the particular problem at issue. As a result of fixing the NDPC patterns in the new post-decomposition layout 12A, a modified circuit layout is produced, as indicated in block 28. This modified circuit layout is then processed through the software 10 beginning with design rule checking and double patterning checking in block 14, as indicated in FIG. 2. This process is then repeated until a final circuit layout is determined to be both design-rule-compliant and double-patterning-compliant.

Design rule checking and double patterning checking are very computationally intense tasks. Usually, design rule checks will be run on each sub-section of a product to minimize the number of errors that are detected at the top level. If run on a single CPU, customers may have to wait up to a week to get the result of a design rule check for modern integrated circuit designs. Most design companies need to or would like to reduce the time involved in performing design rule checking/double patterning checking operations, i.e., it is desirable to achieve reasonable cycle times since design rule checking/double patterning checking operations will likely be performed several times prior to producing a final circuit layout that is both design-rule and double-patterning-compliant. With today's processing power, full-chip design rule checking/double patterning checking operations may be performed more quickly. Nevertheless, reducing the time involved in validating and correcting errors in a product layer such that the final product layout is design-rule-compliant and double-patterning-compliant is a highly desirable goal.

State-of-the-art software for checking for double patterning compliance identifies potential non-double-patterning-compliant (NDPC) patterns through the use of automated decomposition algorithms. Importantly, such software identifies so-called coloring conflicts, but only after the circuit layout has been decomposed. This basic strategy may present several problems. First, since there is, by definition, no coloring solution for a potential non-double-patterning-compliant (NDPC) pattern, the state-of-the-art software uses an arbitrary coloring or masking arrangement as a starting point to decompose the rest of the circuit layout. Such an approach tends to result in a sub-optimal decomposed layout. Second, when using the state-of-the-art methodology, identifying and generating error markers for the features that cause coloring conflicts, i.e., the features that cause the layout to be non-decomposition-friendly, increases the run-time of the software tool, thereby slowing down the design process. Third, the state-of-the-art systems do not provide any localized guidance for fixing the coloring conflict. Unlike traditional rule-based checks and violations, layouts that are determined by the software to be potential non-double-patterning-compliant (NDPC) patterns are typically caused by the interactions among a chain of several features. Even with the error markers provided by the state-of-the-art systems, it is extremely difficult for a layout designer to readily understand the information presented and to devise a timely proposed solution.

The present disclosure is directed to various methods that involve use of pattern matching techniques to identify and resolve potential non-double-patterning-compliant (NDPC) patterns that are encountered when using double patterning techniques to manufacture integrated circuit products which may solve or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods that involve the use of pattern matching techniques to identify and resolve potential non-double-patterning-compliant (NDPC) patterns that are encountered when using double patterning techniques to manufacture integrated circuit products. One illustrative method disclosed herein involves producing an initial circuit layout, prior to decomposing the initial circuit layout, identifying at least one potential non-double-patterning-compliant (NDPC) pattern in the initial circuit layout, fixing the at least one potential non-double-patterning-compliant (NDPC) pattern so as to produce a double-patterning-compliant (DPT) pattern, producing a modified circuit layout by removing the potential non-double-patterning-compliant (NDPC) pattern and adding the double-patterning-compliant (DPT) pattern to the initial circuit layout, and performing design rule checking and double patterning compliance checking on the modified circuit layout.

Another illustrative method disclosed herein includes producing an initial circuit layout, providing a collection of previously determined potential non-double-patterning-compliant (NDPC) patterns and one or more fixes for each of the potential non-double-patterning-compliant (NDPC) patterns, prior to decomposing the initial circuit layout, comparing at least one of the potential non-double-patterning-compliant (NDPC) patterns to the initial circuit layout and matching the at least one potential non-double-patterning-compliant (NDPC) pattern to at least a portion of the initial circuit layout, fixing the portion of the initial circuit layout using the at least one fix associated with the matched at least one potential non-double-patterning-compliant (NDPC) pattern so as to produce a modified circuit layout, and performing design rule checking and double patterning compliance checking on the modified circuit layout.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present disclosure is directed to various methods that involve the use of pattern matching techniques to identify and resolve potential non-double-patterning-compliant (NDPC) patterns that are encountered when using double patterning techniques to manufacture integrated circuit products. As will be readily apparent to those skilled in the art upon a complete reading of the present application, the methods and devices disclosed herein may be employed in the design and fabrication of a variety of devices, such as logic devices, memory devices, ASICs, etc. With reference to the attached figures, various illustrative embodiments of the methods and systems disclosed herein will now be described in more detail.

Figure 3A:
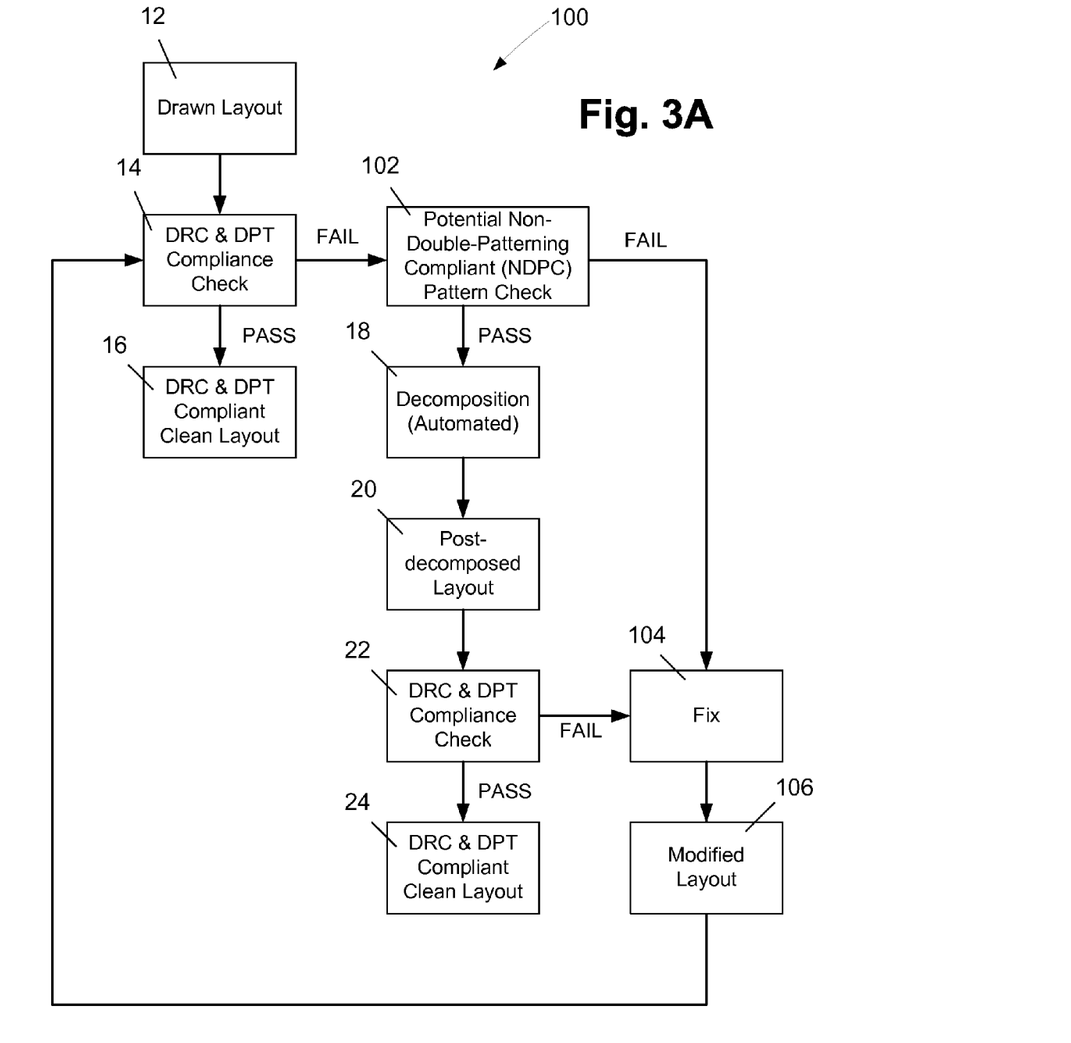
FIGS. 3A-3B depict, in flowchart form, various illustrative embodiments of the novel methods and systems disclosed herein.
Figure 3B:
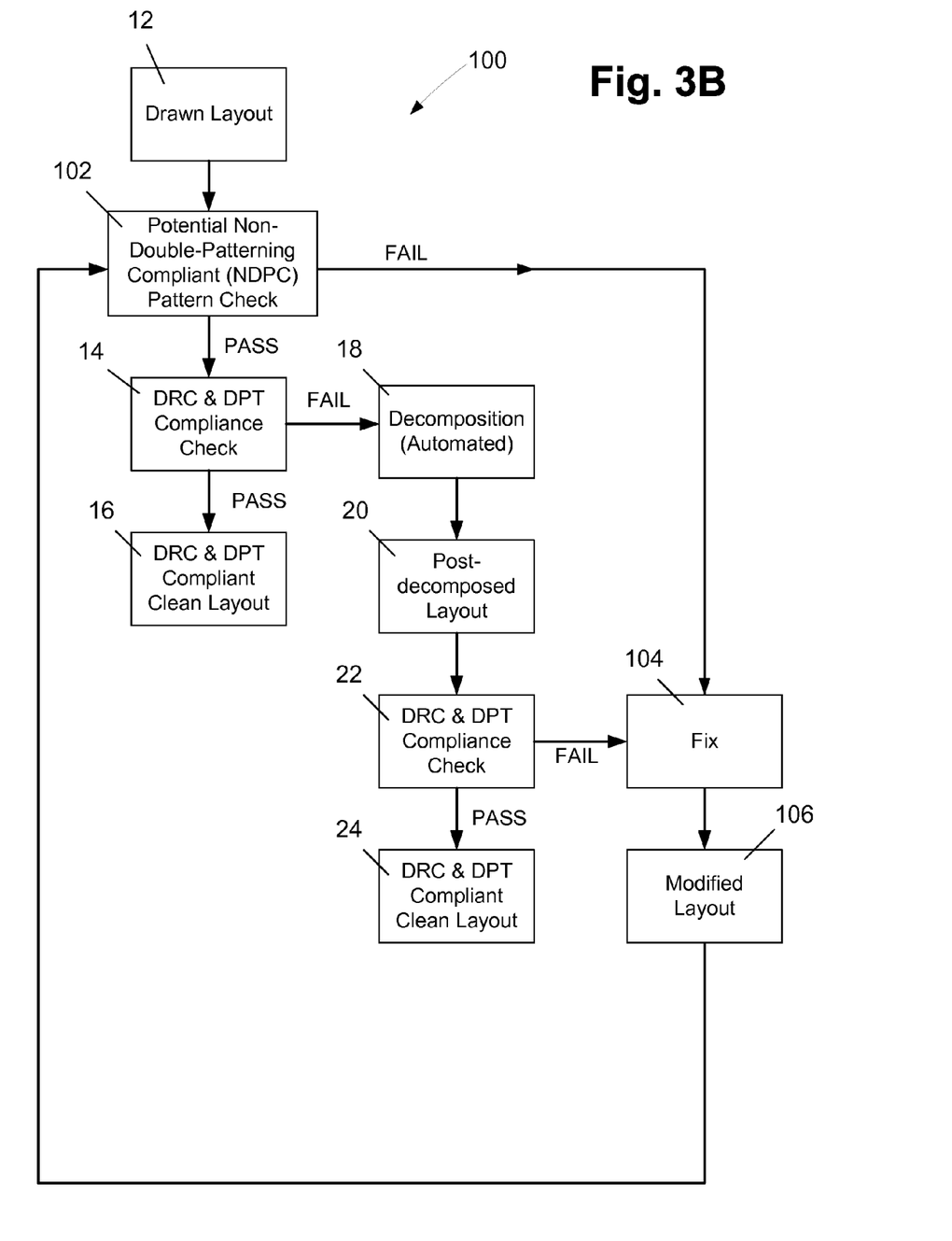

At a very high level, some illustrative aspects of some of the various methods disclosed herein involves, prior to decomposing the circuit layout, using pattern-based methodologies to (1) identify and filter potential non-double-patterning-compliant (NDPC) patterns, (2) provide guidance to the layout designer as to possible means of fixing the potential non-double-patterning-compliant (NDPC) patterns, and (3) fixing the non-double-patterning-compliant patterns. The methods disclosed herein may be performed before or after the design rule checking and/or double patterning checking are performed on the circuit layout. FIG. 3A depicts an illustrative system 100 wherein the identification of potential non-double-patterning-compliant (NDPC) patterns, as reflected in block 102, is performed after the design rule checking and/or double patterning checking, in block 14, are performed on the circuit layout 12. FIG. 3B depicts another illustrative system 100 wherein the identification of potential non-double-patterning-compliant (NDPC) patterns, as reflected in block 102, is performed before the design rule checking and/or double patterning checking, in block 14, are performed on the circuit layout 12. In the system depicted in FIG. 3A, if the design rule checking and double patterning checking, in block 14, does not find any errors, the circuit layout 12 is deemed to be design-rule and double-patterning-compliant, as indicated in block 16, and the pattern recognition checking in block 102 is not performed. In the system depicted in FIG. 3B, if the pattern recognition checking in block 102 does not identify any potential non-double-patterning-compliant (NDPC) patterns in the circuit layout 12, design rule checking and double patterning checking are performed on the circuit layout 12, as indicated in block 14. Other aspects of the systems 100 are the same as those previously described for the prior art system 10 depicted in FIG. 2, wherein like numbers have been used in FIGS. 3A-3B to describe similar functionality.

In both of the systems depicted in FIGS. 3A-3B, once a potential non-double-patterning-compliant (NDPC) pattern, i.e., a coloring conflict, is identified by performing the pattern recognition checking in block 102, the layout designer may use the methods and systems disclosed herein (or other methods) to, if possible, fix the identified potential non-double-patterning-compliant (NDPC) pattern, as indicated in block 104, and thereafter produce a modified circuit layout, as indicated in block 106. At this point, the modified circuit layout is then subjected to design rule checking and double patterning checking, as indicated in block 14.

Figure 4:
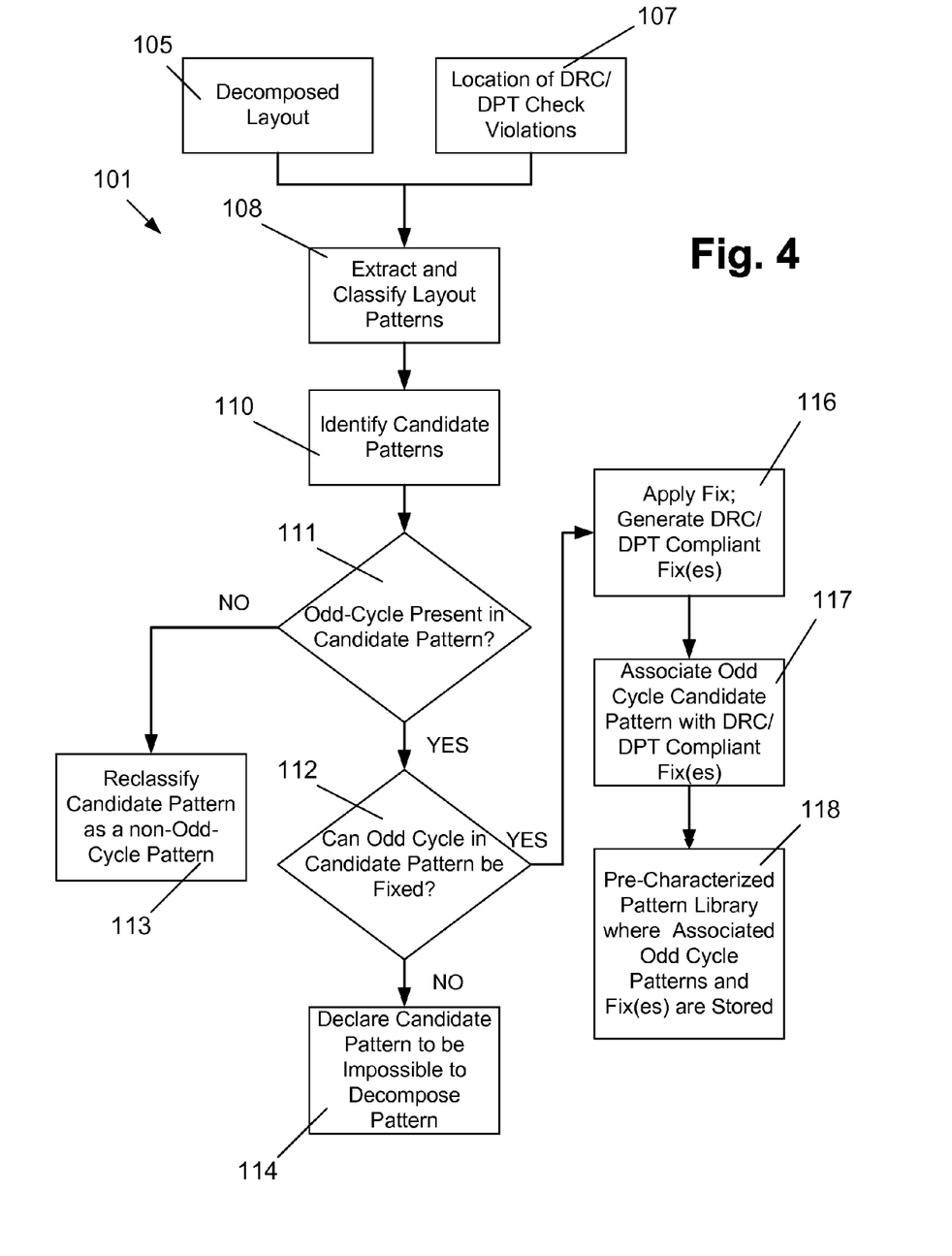
FIG. 4 depicts, in flowchart form, one illustrative embodiment of a pattern recognition and classification unit or tool disclosed herein and how it may be employed.

With reference to FIG. 4, in one embodiment, the methods and systems disclosed herein, involve the use of a pattern recognition and classification unit or tool 101. One example of a commercially available pattern recognition and classification tool that may be employed in practicing the various methods disclosed herein is the Cadence Éclair tool. Other EDA companies, such as Mentor Graphics and Synopsys, have similar tools. As indicated in FIG. 4, inputs to the pattern recognition and classification unit or tool 101 may include, among other things, a decomposed circuit layout (that contains design-rule-checking (DRC) violations and/or double-patterning-technology (DPT) violations), as indicated in block 105, and the location of the DRC and double patterning checking violations in the decomposed circuit layout, as indicated in block 107. Thereafter, as indicated in block 108, the pattern recognition and classification unit or tool 101 extracts and classifies one or more patterns in the decomposed circuit layout (from block 105). Such classification may involve, for example, identifying only unique patterns. If a repeating pattern is found, it will be ignored.

Next, as indicated in block 110, from the group of candidate patterns identified in block 108, the layout designer then uses the pattern recognition and classification unit or tool 101 to identify one or more candidate patterns that the layout designer may be able to fix or replace. In the depicted example, at the decision point 111, the layout designer first attempts to confirm whether or not the candidate pattern actually contains an odd-cycle pattern. The check at decision point 111 is performed because automated decomposition algorithms may, in some cases, identify decomposable patterns as potential non-double-patterning-compliant (NDPC) patterns, i.e., as odd-cycle patterns, because odd-cycle patterns can be difficult to find. If the layout designer determines that the candidate pattern does not contain an odd-cycle, the candidate pattern is then reclassified as a non-odd-cycle pattern, i.e., it is determined to be odd-cycle clean, as indicated in block 113. If the candidate pattern is determined to contain, in fact, an odd-cycle pattern at decision point 111, the system proceeds to decision point 112. In the depicted example, at the decision point 112, the layout designer first attempts to confirm whether or not the candidate pattern can be fixed (or resolved) or whether the candidate pattern under investigation is truly an odd-cycle pattern that cannot be decomposed, i.e., an impossible-to-decompose pattern. In making the determination at decision point 112, the layout designer, based upon prior experience, and perhaps with use of one or more automated EDA tools, attempts to find a double-patterning compliant solution. Importantly, once any potential fix is found, that fix must also be checked to determine whether or not it is also DRC/DPT compliant, as the fix should not introduce new DRC/DPT violations. If all possible fixes for the candidate pattern are determined to be non-DCR/DPT-compliant, i.e., if the fix causes new DRC/DPT violations, then the candidate pattern is deemed to be an impossible-to-decompose pattern, as indicated in block 114. At that point, there is no choice but for the layout designer to develop a fix that changes the dimensions of the physical layout in the candidate pattern under investigation.

In contrast, if the efforts of the layout designer at decision point 112 reveal that there are one or more DRC/DPT compliant fixes for the candidate pattern, then, as indicated in block 116, the fix(es) associated with the candidate pattern is applied to the candidate pattern. This results in the production of one or more DRC/DPT compliant fixes, as indicated in block 116. In block 117, the candidate pattern is associated with the one or more DRC/DPT compliant fixes. The format in which the original candidate pattern and an associated DRC/DPT compliant fix may be stored and/or output to a user may be varied to suit the requirements of the layout designer. In one illustrative embodiment, the output may consist of an image of the original candidate pattern along with a non-colored image and a colored image of the DRC/DPT compliant fix.

Thereafter, as indicated in block 118, the candidate pattern and the associated fix or fixes are stored in a pre-characterized library of patterns for use by the layout designer in future projects. In one illustrative example, when the layout designer is subsequently confronted with a potential non-double-patterning-compliant (NDPC) pattern, the layout designer may search the existing pre-characterized library, using pattern recognition techniques, in an attempt to find a DRC/DPT solution without having to go through the time-consuming correction process. If a solution is found, the layout designer will have saved the time and effort associated with determining a new solution to the potential non-double-patterning-compliant (NDPC) pattern at issue. Simply put, the layout designer may be able to avoid the traditional practice of treating a new potential non-double-patterning-compliant (NDPC) pattern as a brand new problem requiring a brand new cut-and-stitch solution. Such a pre-characterized library may be built up over time based upon experience gained in designing circuit layouts and fixing non-double-patterning-compliant layouts.

Figure 5:
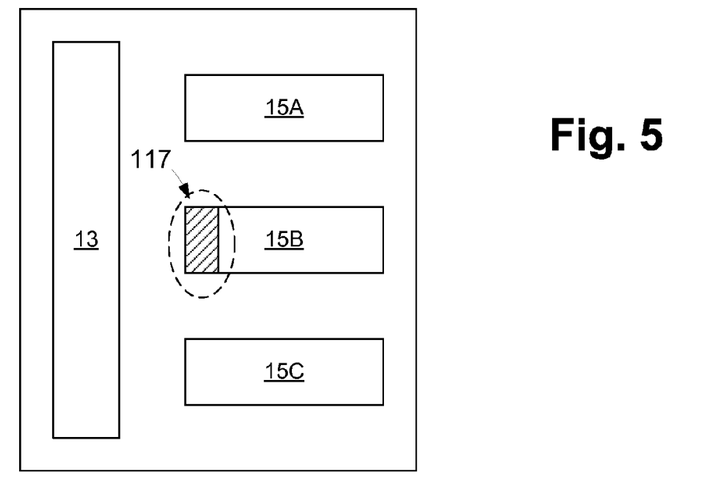
FIG. 5 depicts one illustrative example of how the methods and systems disclosed herein may be employed to clearly mark proposed fixes to potential non-double-patterning-compliant (NDPC) pattern violations.

In theory, there are typically many possible fixes for the candidate patterns identified in block 116. According to one aspect of the inventions disclosed herein, each potential fix can be characterized by the foundry—through simulations or based upon silicon data—so that, of all of the possible solutions, only the most optimal fix is preserved in the pre-characterized library 118. The optimal fix may then be stored in the form of a "marker layer" wherein the fix is clearly identified and shown on the potential non-double-patterning-compliant (NDPC) pattern where the identified fix should be made. For example, with reference to the pattern 11 shown in FIG. 1A, the pattern recognition and classification unit or tool 101 may clearly indicate the "fix" shown in FIG. 1D by, for example, using a unique and conspicuous coloring of the "fix" on the original pattern 11. In FIG. 5, the fix to the pattern 11, i.e., the reduction in axial length of the feature 15B, is indicated by the cross-hatched portion 117. Such localized guidance and clear markings of the proposed fixes will greatly assist the layout designer in determining the best or most efficient way of resolving the coloring conflict.

Figure 6:
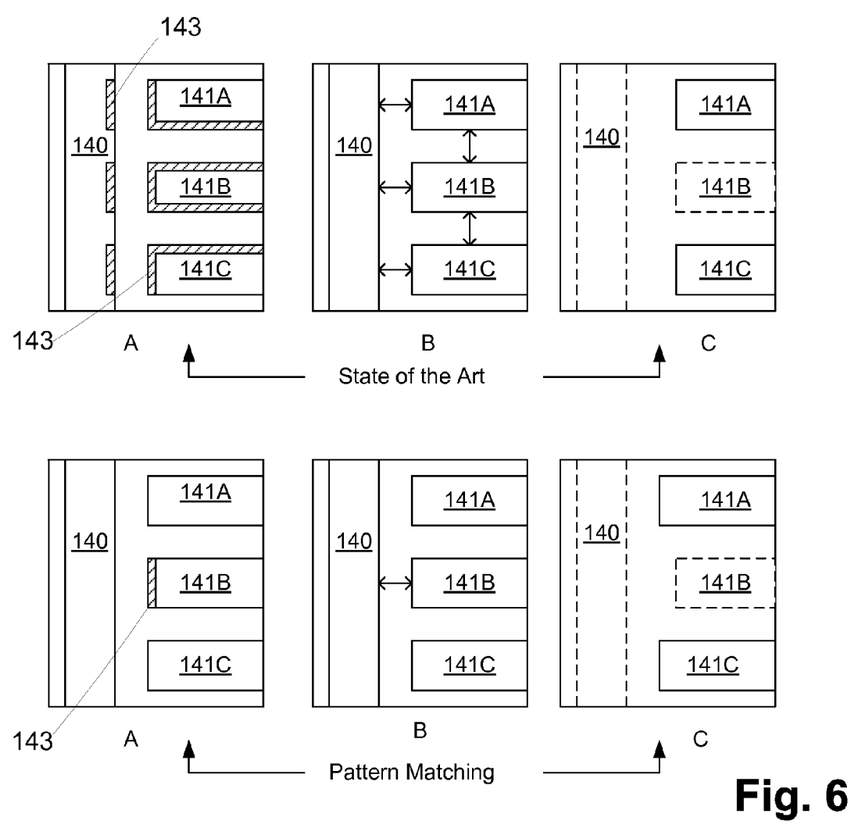
FIG. 6 depicts an illustrative example of where the novel pattern matching methods disclosed herein may be employed to provide more useful local guidance to the layout designer as compared to the guidance provided by an illustrative prior art system.

FIG. 6 depicts an illustrative example of where the systems and pattern matching methods disclosed herein may be employed to provide more useful local guidance to the layout designer, as compared to an illustrative example of the guidance provided by an illustrative prior art system. In both cases, the pattern at issue consists of an illustrative line 140 and a plurality of additional lines 141A-C that are oriented transverse to the line 140. In FIG. 6, "A" shows the error markers provided by the state-of-the-art systems versus the error markers provided by the pattern matching flow described herein; "B" shows the fixes that are depicted using the two different techniques; and "C" shows the modified decomposed layouts for manufacturing, where one mask is indicated by dashed lines and another mask is indicated by the use of solid lines. A DPT violation is depicted by dashed regions 143 and potential solutions are depicted by double arrows that reflect the potential movement of the features to remove the DPT violations. As can be seen in FIG. 6, the state-of-the-art system outputs many, if not all, possible solutions for the subject pattern. In the depicted example, the state-of-the-art system has identified five potential solutions to make the subject pattern DPT compliant: increase to the tip-to-side spacing between each of the lines 141A-C; increase the spacing between the lines 141A-141B; or increase the spacing between the lines 141B-141C. The output of such a vast amount of information can make the process of obtaining a desired solution much more difficult for the layout designer. In view C, the solution ultimately selected was to increase to the tip-to-side spacing between each of the lines 141A-C. In contrast, using the pattern matching methods disclosed herein, only a single DPT compliant fix is output, i.e., note the single DPT violation 143 depicted on line 141B and the indicated spacing fix needed in view B. View C depicts the solution ultimately selected, i.e., an increase in the tip-to-side spacing between only the line 140 and the line 141B.

Figure 7:
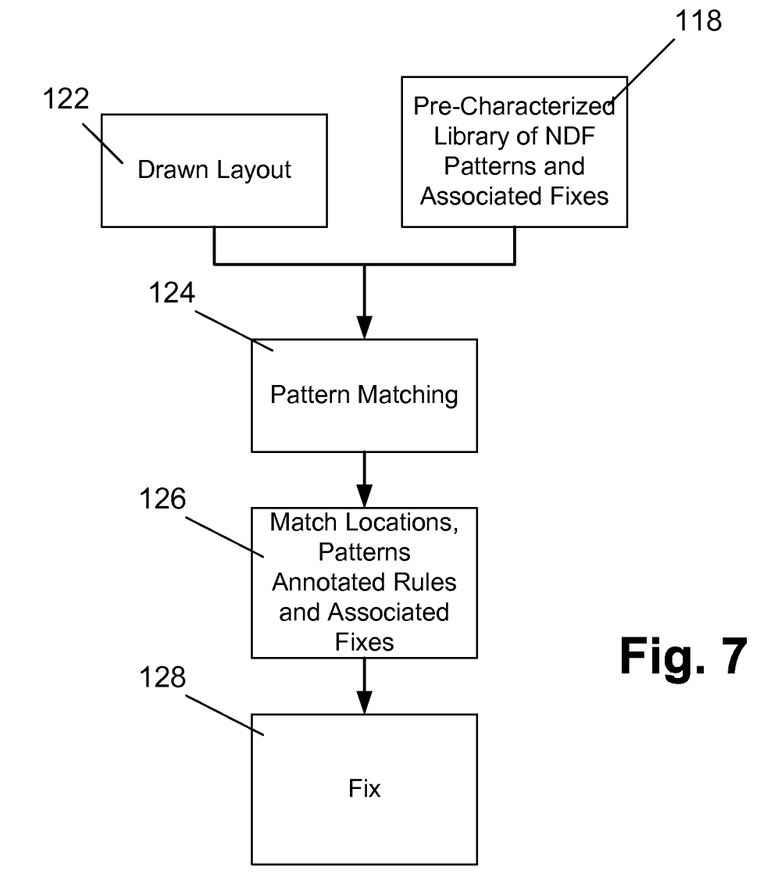
FIG. 7 depicts, in flowchart form, another illustrative embodiment of a method and system disclosed that involves the use of pattern recognition techniques to resolve coloring conflicts.

FIG. 7 depicts another aspect of the various methods disclosed herein. In this embodiment, over time, a library of potential non-double-patterning-compliant (NDPC) patterns or layouts and their associated fixes is created, as indicated in block 118. The pattern recognition and classification unit or tool 101 may then use pattern matching techniques to scan the drawn circuit layout 122 for patterns that are similar to the potential non-double-patterning-compliant (NDPC) patterns that are stored in the library 118, as indicated in block 124. If one or more matching patterns are found, the pattern recognition and classification unit or tool 101 then outputs all of the matching patterns from the library 118, and associated error locations, annotated rules and their corresponding fixes, as indicated in block 126. The layout designer may then use some or all of the information obtained in block 126 to produce the ultimate fix for the pattern identified in the circuit layout 122, as indicated in block 128.

Figure 8:
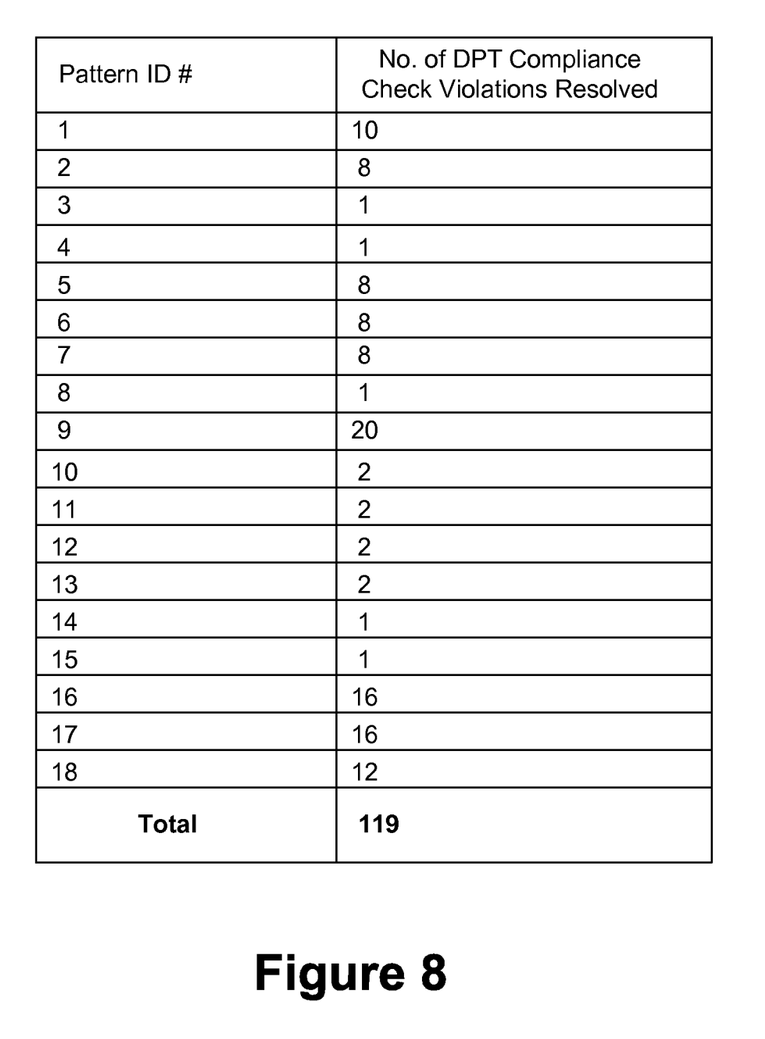
FIG. 8 is a table depicting one illustrative application where methods disclosed herein were employed to reduce the number of non-double-patterning-compliant pattern violations.

The methods and systems disclosed herein have been employed and demonstrated great utility. More specifically, one or more of the methods disclosed herein was employed on a layout of a metal 1 layer that was migrated from a previous product. In this example, the library (FIG. 7, block 118) consisted of eighteen potential non-double-patterning-compliant (NDPC) patterns and their associated fixes. Initially, an original circuit layout was subjected to design rule checking and double patterning checking using the prior art technique described above in connection with FIG. 2. The prior art processing involved decomposing the original circuit layout and it resulted in the identification of 400 DRC and DPT compliance check layout violations. Thereafter, prior to decomposing the original circuit layout, the pattern matching techniques disclosed herein were applied to the original circuit layout, whereby the pattern recognition and classification unit or tool 101 compared the eighteen NDPC patterns in the library to the original circuit layout. By eliminating the eighteen NDPC patterns from the original layout prior to decomposition, 119 of the 400 potential non-double-patterning-compliant (NDPC) pattern violations were resolved. This represented a decrease of about 29.8% in the number of potential non-double-patterning-compliant (NDPC) pattern violations. FIG. 8 is a table that reflects the foregoing data.

From the foregoing, it should be clear to those skilled in the art that the methods and systems disclosed herein may provide great benefit and advantages to layout designers. More specifically, the methods disclosed herein may: (1) permit a layout designer to resolve at least some coloring conflicts without the use of decomposition algorithms; (2) provide localized guidance to the designer in the form of simple and easy to understand rules for fixing potential non-double-patterning-compliant (NDPC) patterns, such that they become decomposable (double-patterning compliant); (3) reduce overall design cycle time by identifying the potential non-double-patterning-compliant (NDPC) pattern violations prior to decomposition; and (4) increase product yields through the use of pre-characterized manufacturing-friendly patterns that are double-patterning-compliant.

As is evident from the discussion above, some features of the subject matter disclosed herein may be implemented in software. For instance, some or all of the various acts described above may be software-implemented, in whole or in part. Thus, some features or acts of the presently disclosed inventions may be implemented as instructions encoded on a computer-readable, program storage medium. The program storage medium may be of any type suitable to the particular implementation. However, the program storage medium will typically be magnetic, such as the floppy disk, a computer, a hard disk drive, an optical disk, etc. When these instructions are executed by a computer, they perform the disclosed functions. The computer may be a desktop computer or, alternatively, the computer may be an embedded processor. The computer might also be a laptop, a workstation or a mainframe in various other embodiments. Thus, the scope of the invention should not be considered to be limited by the type or nature of the program storage medium or computer with which embodiments of the invention might be implemented.

Thus, some portions of the detailed descriptions herein are, or may be, presented in terms of algorithms, functions, techniques and/or processes. These terms enable those skilled in the art most effectively to convey the substance of their work to others skilled in the art. These terms are here, and are generally, conceived to be a self-consistent sequence of steps leading to a desired result. The steps are those requiring physical manipulations of physical quantities. Usually, though not necessarily, these quantities take the form of electromagnetic signals capable of being stored, transferred, combined, compared and otherwise manipulated.

It has proven convenient at times, principally for reasons of common usage, to refer to these signals as bits, values, elements, symbols, characters, terms, numbers and the like. All of these and similar terms are to be associated with the appropriate physical quantities and are merely convenient labels applied to these quantities and actions. Unless specifically stated otherwise, or as may be apparent from the discussion, terms such as "processing," "computing," "calculating," "determining," "displaying" and the like used herein refer to the action(s) and processes of a computer system, or similar electronic and/or mechanical computing device, that manipulates and transforms data, represented as physical (electromagnetic) quantities within the computer system's registers and/or memories, into other data similarly represented as physical quantities within the computer system's memories and/or registers and/or other such information storage, transmission and/or display devices.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
producing an initial circuit layout that includes an impossible to decompose pattern;
identifying at least one potential non-double-patterning-compliant (NDPC) pattern in said initial circuit layout;
fixing said at least one potential NDPC pattern by modifying the initial circuit layout; and
performing a design rule checking process and a double patterning compliance checking process on said modified circuit layout.

2. The method of claim 1, wherein said step of identifying at least one potential NDPC pattern in said initial circuit layout is performed after performing the design rule checking process and the double patterning compliance checking process on said initial circuit layout.

3. The method of claim 1, wherein the impossible to decompose pattern includes the initial circuit layout having an odd-cycle pattern that cannot be formed by double patterning techniques.

4. The method of claim 1, wherein, prior to performing the step of fixing said at least one potential NDPC pattern, the method involves comparing said potential NDPC pattern to a collection of previously determined double-patterning-compliant patterns that includes one or more fixes for the impossible to decompose pattern.

5. The method of claim 4, wherein the method further comprises matching said at least one potential NDPC pattern to at least one of said double-patterning compliant patterns.

6. The method of claim 1, wherein said initial circuit layout is a circuit layout for an entire integrated circuit product.

7. The method of claim 1, wherein modifying said initial circuit layout includes developing a fix that changes a physical layout dimension of the initial circuit layout.

8. A method, comprising:
producing an initial circuit layout that includes an impossible to decompose pattern;
identifying at least one potential non-double-patterning-compliant (NDPC) pattern in said initial circuit layout;
comparing said potential NDPC pattern to a collection of previously determined double-patterning-compliant patterns;
matching said at least one potential NDPC pattern to at least one of said double-patterning-compliant patterns;
producing a modified circuit layout by removing said potential NDPC pattern and adding said double-patterning-compliant pattern to said initial circuit layout; and
performing a design rule checking process and a double patterning compliance checking process on said modified circuit layout.

9. The method of claim 8, wherein said step of identifying at least one potential NDPC pattern in said initial circuit layout is performed after performing the design rule checking process and the double patterning compliance checking process on said initial circuit layout.

10. The method of claim 8, wherein said collection of previously determined double-patterning-compliant patterns includes one or more fixes for the impossible to decompose pattern.

11. A method, comprising:
producing an initial circuit layout that includes an impossible to decompose pattern;
providing a collection of previously determined potential non-double-patterning-compliant (NDPC) patterns for the impossible to decompose pattern and at least one fix for each of said potential NDPC patterns;
comparing at least one of said potential NDPC patterns to said initial circuit layout and matching said at least one potential NDPC pattern to at least a portion of said initial circuit layout;
fixing said portion of said initial circuit layout using said at least one fix associated with said matched at least one potential NDPC pattern so as to produce a modified circuit layout; and
performing a design rule checking process and a double patterning compliance checking process on said modified circuit layout.

* * * * *